UNITED STATES PATENT OFFICE.

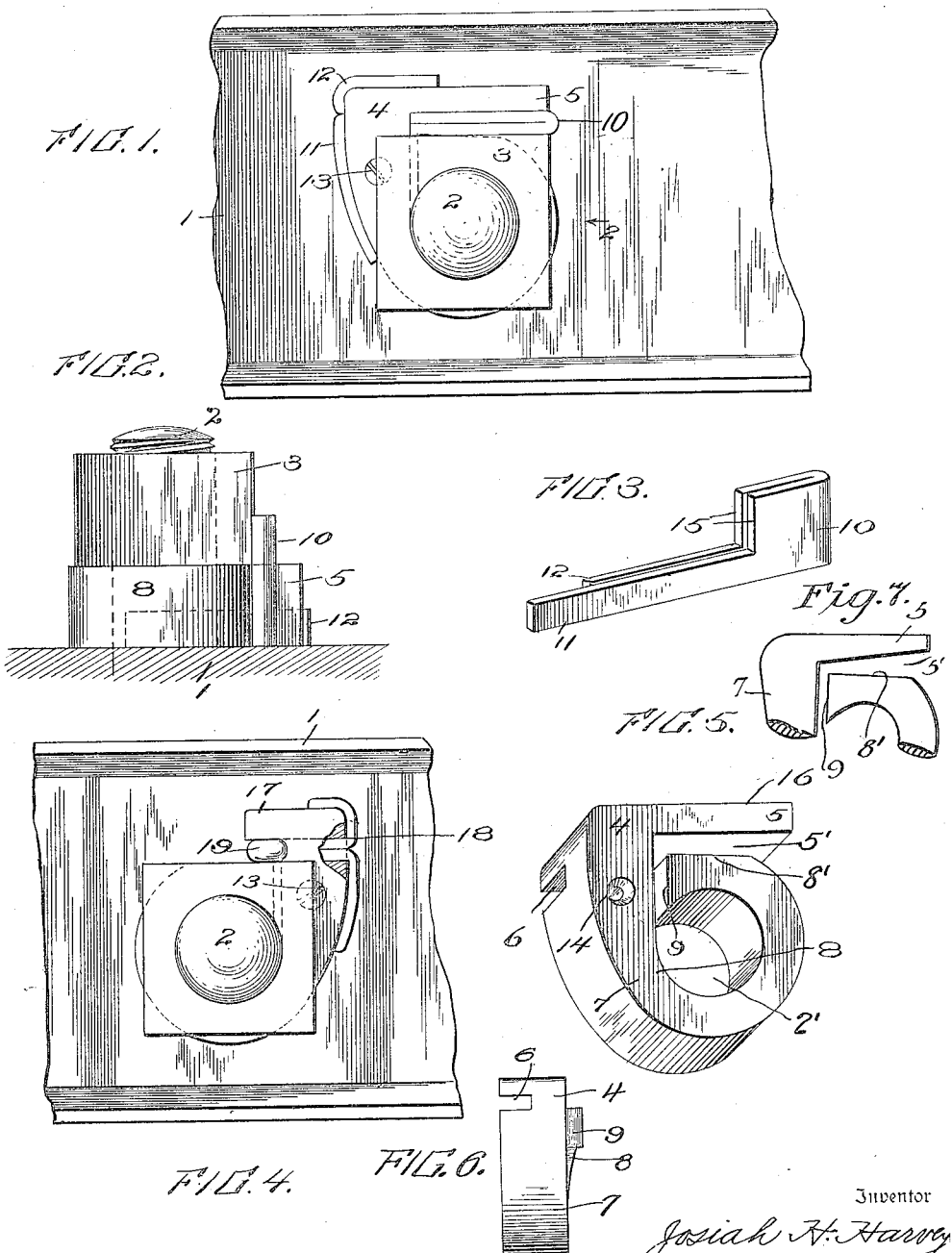

JOSIAH H. HARVEY, OF SCRANTON, PENNSYLVANIA, ASSIGNOR TO REBECCA ORENSTEIN, OF HARTFORD, CONNECTICUT.

NUT-LOCK.

1,144,979.   Specification of Letters Patent.   Patented June 29, 1915.

Application filed July 31, 1913.   Serial No. 782,385.

*To all whom it may concern:*

Be it known that I, JOSIAH H. HARVEY, a citizen of the United States, residing at Scranton, in the county of Lackawanna and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks and an object of the invention is to provide an improved washer for a nut lock so formed that a portion of the same may be bound against the bolt to lock the same.

A further object of the invention is to provide a nut lock washer with means for holding the same against movement with respect to the nut, and in further providing an improved pin which is so formed that a portion of the same may be bent around the washer to lock the pin against the washer.

A still further object of the invention is to provide a washer so formed that the same may be used without auxiliary locking means when the washer is applied to any formation having an edge.

With these and other objects in view which will appear as the description proceeds, the invention resides in the combination of a washer and a split pin shaped as claimed below.

In the drawings, wherein two forms of the invention are shown: Figure 1 is a front elevation of a beam having a bolt therein showing the nut lock applied thereto. Fig. 2 is a side elevation of the nut lock shown in Fig. 1. Fig. 3 is a perspective view of one form of pin which may be used. Fig. 4 is a front elevation of the nut lock with a modified form of pin and washer. Fig. 5 is a perspective view and Fig. 6 an edge view of the washer; and Fig. 7 is a fragmentary detail to be referred to hereinafter.

Similar reference characters designate corresponding parts.

The general aim of this invention is to provide a nut lock having a washer designed to be interposed between the nut and the material to which the bolt is secured or passes through, said washer having a reduced leg which is shaped so as to form a substantially circular opening through which the bolt may pass, the end of said leg forming, with an extension on the washer, a space for a key and out of which an interference member, thereon may project to lock against the nut. The split pin may be in effect a cotter pin with its closed end bent at right angles to the rest of the pin to constitute said interference member or it may be of a special construction having the looped end wider than the open end, but there are other forms of pins which may be used with substantially the same results as those obtained by using the two forms disclosed.

Referring to the drawings, 1 represents a beam through which passes a threaded bolt 2 such as is used in railway practice, structural steel, or other arts. A nut 3 is designed to thread upon the bolt 2, the nut and bolt being of ordinary construction and forming no particular part of the present invention.

The washer forming an important part of this invention is to be mounted on the threaded end of the bolt against the beam or rail through which the bolt passes, and under the nut as usual. It is not necessary that the washer occupy the exact position shown in Figs. 1 and 5, but for sake of convenience I will describe it in such position. It comprises an upright body portion 4 which has an extension 5 and an opening or slot 6 formed in the portion of the body of the washer opposite the extension.

As shown in Fig. 3, the preferred form of key is a split pin whose closed end comprises a substantially rectangular body 10 and whose open end comprises arms 11 and 12 of lesser width than the body 10, said pin being constructed from a single piece and bent in the same operation to a form substantially as shown. The body 10 of this pin is designed to be of substantially the same length as the extension 5 of the washer and is of such width as to extend beyond the face of the washer into an interference member 15.

When it is desired to apply the washer and pin as shown in Fig. 1, the washer is slipped over the bolt 2 before the nut 3 is applied thereto and may be secured to the beam or other structure 1 by means of a washer-fastening member such as a screw 13 passing through a hole 14 formed in the body portion 4 of the washer, this screw 13 being engaged with the beam in a way to prevent rotation of the washer with respect to the said beam. The nut 3 may then be slipped on the bolt and tightened down onto the head of the screw 13 after which the pin as shown in Fig. 3 will be applied by passing the arms 11 and 12 under the extension 5 and through slot 6 until the interference member 15 of the body portion 10 strikes the side of the body 4. After this the arms may be spread apart as usual with split pins or bent about the washer, one extending on either side of the slot 6 and locking against the washer in such a way as to hold the body portion 10 within the way between extension 5 and the end 9 of the washer leg. At this time the rather wide body 10 extends sufficiently outward to form said interference member 15 for locking the nut 3 in place.

The key way may have parallel sides or the end 9 may be so formed as to provide a tapered way, see Fig. 7, the inner end of which adjacent body portion 4 is smaller than the outer end, so that as the pin is driven into position said end 9 of the washer-leg will be caused to bear tightly against the threads of the bolt 2, after which the arms 11 and 12 may be bent around the washer. The washer is made of such material as will allow it to bend under such pressure as will be brought to bear upon the end 9 to press it against the bolt. Of course if the washer be so placed that the upper edge 16 thereof, which is substantially straight, lies adjacent a protruding edge of the material (such as the flange of an I beam) through which the bolt 2 passes, the same may serve to prevent relative motion between the washer and said material, and in this instance, there will be no need to provide the screw 13.

By referring to Fig. 4 it will be seen that this washer may be used in conjunction with a modified form of key. This is in effect a cotter pin, the closed end of which is bent forwardly into an interference member 19 while its body is intended to lie within the space between the extension 17, which may be of less length than the extension 5, and the inbent end 9 of the washer. The split or open end of the pin passes through an opening which is here a substantially circular perforation 18 comparable with slot 6 formed in the preferred form of the invention, the arms of the pin being bent around the washer in the modified form the same as in the preferred form. The closed end of the cotter pin constituting said interference member 19 may be located adjacent the center of the nut which it is designed to lock, or it may be placed so as to prevent the turning of the nut by engaging that corner which would pass by the interference member when the nut was loosened with respect to the bolt.

As shown in Fig. 6 the end 9 of the washer may be twisted out of the plane of the body portion 4 thereof so that when the nut is drawn down against the same this twisted or outbent end 9 will act as a spring member to hold the nut against displacement while the key is being applied or even afterward. This detail might be employed if desired, or may be omitted. In fact, the invention is susceptible of considerable modification in its details without departing from the principle involved, and I reserve the right to make such changes as come within the scope of the claims below.

While it will probably be cheapest to stamp out the washer in the shape shown, and to stamp out the key blank and then bend it into the shape shown, I reserve the right to make these members by any suitable means and of any appropriate material and size.

I claim:

1. A nut lock for a bolt comprising a washer, a leg extending from said washer and shaped to form a substantially circular opening through which the bolt passes, an extension formed on the washer, and a split pin having a closed end located between the extension and the bent end of the washer, the split ends of the pin adapted to be bent back on the washer, and an interference member formed on said pin adapted to lock the nut.

2. A nut lock for a bolt comprising a washer surrounding said bolt, a leg extending from said washer and shaped to form substantially a circular opening through which the bolt passes, an extension on the washer forming with said bent leg a tapered opening, a split pin the closed end of which forms an interference member, adapted to lie within the tapered opening, the open ends of said split pin adapted to be bent back against the washer, and a nut engaged by said interference member.

3. A nut lock for a bolt comprising a washer surrounding said bolt comprising a body portion, a leg extending from said body portion bent around said bolt, an extension from the body portion adjacent the bent end of the leg, a split pin having an interference member adapted to lie between the extension and the bent end of the said leg, and a nut yieldably engaged by said bent end, to hold the nut against displacement.

4. A nut lock such as described, comprising a split pin having an open and a closed end shaped to form an interference member, and a washer having a transverse way to receive said pin and hold said member in the path of the nut bearing upon the washer when the open end of the pin extends beyond the edge of said washer and is bent thereupon.

5. A bolt, a nut, and a split washer having a keyway extending completely through it transverse to and alongside its bolt-opening; combined with a key in said keyway having a head at one end deflected into an interference member projecting beyond the face of the washer and overlying the edge of the nut, the other end of the key projecting from the keyway and bent, for the purpose set forth.

6. A split washer, part of whose split constitutes a space transverse to the bolt opening, the body of the washer having an opening in line with said space; combined with a key whereof one end is adapted to be driven through said space and opening and bent, and the other end is adapted to stand in said space and has an interference member projecting beyond the face of the washer, for the purpose set forth.

7. A bolt, a nut, and a washer comprising an upright body tapered at its lower part into a leg curving around the bolt and having its outer end free, and an extension projecting from the upper part of the body over and spaced from said end; combined with a key adapted to be driven into said space, the key having a member extending forward of the washer and engaging the nut.

8. A bolt, a nut, and a washer comprising a body, a resilient leg projecting therefrom and curving around the bolt with its free end flattened and its extremity standing near said body, and an extension projecting from the body and spaced from the flattened portion of said leg, said body having an opening alined with such space and forming with it a transverse keyway through the washer; combined with a key adapted to be driven into said keyway and having a member extending forward of the washer and engaging the nut.

9. A washer comprising an upright body having a transverse opening, an extension to one side of the body on a line above said opening, and a yielding leg depending from said body, curved to form the bolt-opening, and having its free end standing below said extension to produce a space alined with said transverse opening, said free end being twisted out of the plane of the extension; combined with a key in the form of a pin whereof one end is adapted to pass through said transverse opening when its other end stands in said space, the last-named end having a member projecting forward of the washer, for the purpose set forth.

10. In a nut lock, the combination with a washer comprising a stiff body having a transverse opening, a lateral extension from the body, and a yielding leg projecting from said body, curved to form the bolt-opening, and having its free end flattened opposite said extension and producing a space tapering toward and alined with said transverse opening, said free end being twisted out of the plane of the extension; of a key in the form of a split pin whose arms are adapted to pass through said transverse opening when its head stands in said tapered space, said head having a member projecting forward of the washer, for the purpose set forth.

11. A bolt, a nut, and a washer having through it a keyway transverse to its bolt-opening and a hole parallel with said opening; combined with a washer-fastening member seated in said hole and overlaid by the nut, and a key in said keyway and having a member projecting forward of the washer and overlying the edge of the nut.

In testimony whereof I affix my signature in presence of two witnesses.

JOSIAH H. HARVEY.

Witnesses:
N. C. O'MALLEY,
J. A. HEALEY.

Copies of this patent may be obtained for five cents each, by addressing the "Commissioner of Patents, Washington, D. C."